(12) United States Patent
Wang et al.

(10) Patent No.: US 9,288,793 B2
(45) Date of Patent: Mar. 15, 2016

(54) METHOD AND APPARATUS FOR DEVICE-TO-DEVICE COMMUNICATION SETUP

(75) Inventors: Jiang Wang, Shanghai (CN); Jing Xu, Shanghai (CN); Zhenhong Li, Shanghai (CN); Haifeng Wang, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 523 days.

(21) Appl. No.: 13/583,719

(22) PCT Filed: Mar. 11, 2010

(86) PCT No.: PCT/CN2010/070991
§ 371 (c)(1),
(2), (4) Date: Sep. 10, 2012

(87) PCT Pub. No.: WO2011/109941
PCT Pub. Date: Sep. 15, 2011

(65) Prior Publication Data
US 2013/0005377 A1     Jan. 3, 2013

(51) Int. Cl.
H04B 7/00      (2006.01)
H04W 72/04     (2009.01)
H04W 12/08     (2009.01)
H04W 76/02     (2009.01)
H04W 92/18     (2009.01)

(52) U.S. Cl.
CPC .......... *H04W 72/0406* (2013.01); *H04W 12/08* (2013.01); *H04W 76/023* (2013.01); *H04W 92/18* (2013.01)

(58) Field of Classification Search
USPC ............. 455/41.2, 423, 420, 553.1, 566, 419, 455/552.1, 557, 418; 345/689, 650, 204, 345/205
See application file for complete search history.

(56) References Cited

U.S. PATENT DOCUMENTS 6,570,868 B1 *  5/2003  Cable et al. ............. 370/351
6,650,629 B1 * 11/2003  Takahashi et al. ....... 370/335
7,323,970 B1    1/2008  Murray et al.
(Continued)

FOREIGN PATENT DOCUMENTS

CN       1527635 A     9/2004
CN       101513114 A   8/2009
(Continued)

OTHER PUBLICATIONS

Office action received for corresponding Chinese Patent Application No. 201080065335.1, dated Aug. 8, 2014, 13 pages of office action, No English Language Translation available.
(Continued)

*Primary Examiner* — Dominic E Rego
(74) *Attorney, Agent, or Firm* — Mintz Levin Cohn Ferris Glovsky and Popeo, P.C.

(57) ABSTRACT

Disclosed are methods and apparatus for setting up cellular controlled device-to-device communications. A method can comprise sending, from a first device to a radio network node, a request to initiate device-to-device communication with a second device, the request comprising an identification of the second device and a first indicator indicating an intention of a device-to-device type of the communication; receiving, from the radio network node, a resource allocation; and transmitting service contents in the device-to-device communication directly between the first device and the second device using the allocated resources.

20 Claims, 7 Drawing Sheets

(56) References Cited

U.S. PATENT DOCUMENTS

| | | |
|---|---|---|
| 7,421,470 B2* | 9/2008 | Ludwig et al. ............ 709/204 |
| 8,712,455 B2* | 4/2014 | Gosset et al. ............ 455/466 |
| 2002/0062310 A1 | 5/2002 | Marmor et al. |
| 2003/0022664 A1* | 1/2003 | Goldstein ............ 455/420 |
| 2004/0203685 A1* | 10/2004 | Woodward et al. ............ 455/418 |
| 2005/0050189 A1* | 3/2005 | Yang ............ 709/223 |
| 2006/0089914 A1* | 4/2006 | Shiel et al. ............ 705/52 |
| 2006/0165035 A1 | 7/2006 | Chandra et al. |
| 2006/0185005 A1* | 8/2006 | Graves et al. ............ 726/9 |
| 2007/0104214 A1* | 5/2007 | Hsieh et al. ............ 370/458 |
| 2007/0213039 A1 | 9/2007 | Skog |
| 2007/0232347 A1* | 10/2007 | Persson et al. ............ 455/550.1 |
| 2007/0250880 A1* | 10/2007 | Hainline ............ 725/97 |
| 2008/0002658 A1* | 1/2008 | Soliman ............ 370/343 |
| 2008/0186896 A1* | 8/2008 | Fanfelle et al. ............ 370/312 |
| 2009/0005024 A1* | 1/2009 | Kato ............ 455/417 |
| 2009/0116430 A1* | 5/2009 | Bonta et al. ............ 370/329 |
| 2009/0278665 A1* | 11/2009 | Raggam et al. ............ 340/10.5 |
| 2010/0009675 A1 | 1/2010 | Wijting et al. |
| 2010/0019972 A1* | 1/2010 | Evans ............ 342/450 |
| 2010/0091653 A1* | 4/2010 | Koodli et al. ............ 370/235 |
| 2010/0144357 A1* | 6/2010 | Chaudhri et al. ............ 455/450 |
| 2010/0215024 A1* | 8/2010 | Chiang ............ 370/338 |
| 2010/0279706 A1* | 11/2010 | Dicke ............ 455/456.1 |
| 2010/0330903 A1* | 12/2010 | Chabrerie ............ 455/39 |
| 2011/0093521 A1* | 4/2011 | Georgis et al. ............ 709/203 |

FOREIGN PATENT DOCUMENTS

| | | |
|---|---|---|
| EP | 1604538 A2 | 12/2005 |
| EP | 1998499 A1 | 12/2008 |
| EP | 2012443 A2 | 1/2009 |
| EP | 1417857 B1 | 7/2009 |
| WO | 2004/077917 A2 | 9/2004 |
| WO | 2009/009608 A2 | 1/2009 |

OTHER PUBLICATIONS

Janis et al., "Device-to-Device Communication Underlaying Cellular Communications Systems", International Journal Communications, Network and System Sciences, vol. 2, Issue: 3, Jun. 2009, pp. 169-178.

International Search Report and Written Opinion received for corresponding International Patent Application No. PCT/CN2010/070991, dated Dec. 23, 2010, 8 pages.

Osseiran et al., "Advances in Device-to-Device Communications and Network Coding for IMT—Advanced", Proceedings of ICT Mobile Summit Conference, Jun. 10-12, 2009, pp. 1-8.

Janis et al., "Interference-Aware Resource Allocation for Device-to-Device Radio Underlaying Cellular Networks", IEEE 69th Vehicular Technology Conference, Apr. 26-29, 2009, 5 pages.

Doppler et al., "Device-to-Device Communications; Functional Prospects for LTE—Advanced Networks", IEEE International Conference on Communications Workshops, Jun. 14-18, 2009, pp. 1-6.

* cited by examiner

Fig. 6B sending, from a first device to a radio network node, a request to initiate device-to-device communication with a second device, the request comprising an identification of the second device and a first indicator indicating an intention of a device-to-device type of the communication.  710 receiving, from the radio network node, a resource allocation.  720 transmitting service contents in the device-to-device communication directly between the first device and the second device using allocated resources.  730

METHOD AND APPARATUS FOR DEVICE-TO-DEVICE COMMUNICATION SETUP

RELATED APPLICATION

This application was originally filed as PCT Application No. PCT/CN2010/070991 filed Mar. 11, 2010.

TECHNICAL FIELD

The exemplary and non-limiting embodiments of this invention relate generally to wireless communication technology, and more particularly, relate to the setup of cellular controlled D2D (Device-to-Device) communication.

BACKGROUND

With the development of the future service, next generation wireless communication systems, such as 3GPP (third Generation Partnership Project) LTE (long term evolution), WiMAX (World Interoperability for Microwave Access) and IMT-A (International Mobile Telecommunications-Advanced) system etc. are introduced to satisfy the QoS (Quality of Service) of various services. However, another challenge becomes evident: the increasing power consumption of the mobile device and the battery capacity does not keep pace with the increasing demand for energy to handle the upcoming tasks.

To overcome the aforementioned drawbacks, cellular controlled D2D communication systems are introduced.

Cellular controlled D2D communication can be seen as one complementary for the conventional cellular communication systems, and is compatible to any cellular communication technology e.g. GSM, UMTS, 3GPP LTE, WiMAX, or IMT-A etc. Compared with conventional cellular communication systems, cellular controlled D2D systems have the following advantages: power saving, capacity improvement and lower service cost etc for UE perspective, higher revenue, larger market penetration and new services for network provider, higher revenue, service scalability for service provider, low and energy saving for device manufacture.

More particular, cellular controlled D2D communication refers to a kind of D2D communication in which the traffic are transmitted directly between the terminal devices such as user equipments, while the traffic transmission is controlled by cellular network nodes such as eNBs (evolved Node B). For example, in a cellular controlled D2D communication, the random access, authorization, resource provision, and charging etc. are controlled by eNBs. In addition, the D2D communication with semi-distributed scheduling (which means D2D has limited scheduling ability under eNB's supervision) also belongs to cellular controlled D2D communication.

Figure 1:
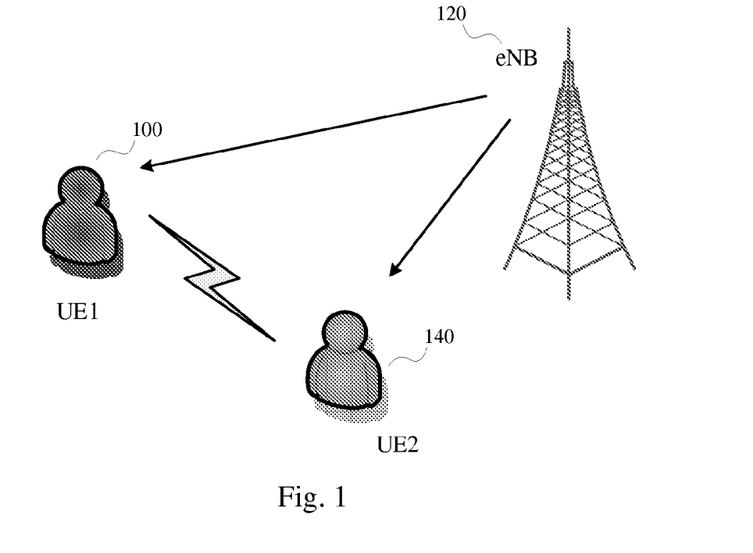
FIG. 1 shows a scenario of cellular controlled D2D communication.

However, there exist some problems to be solved in the conventional cellular controlled D2D communication system. FIG. 1 shows such a scenario, wherein the geographical location of the participators (such as UE (User Equipment) 1 and UE2) intended to establish a cellular controlled D2D communication therebetween are very close, and the participators even know the situation each other, e.g. they are face to face in the same meeting room. For conventional cellular communication system, all the UEs are only communicated with eNB and they can't communicate directly. To apply D2D communication, according to the conventional cellular controlled communication, the channel quality between UEs should be in addition measured and feedback to eNB, so that the eNB can decide whether or not the situation is feasible to set up the cellular controlled D2D communication between UE1 and UE2. However, there is a fact that the participators (such as UE1 and UE2) know the situation relating to the channel quality better than the eNB. The measurement and feedback for D2D setup resulting in large latency and resource waste seem to be redundant in the above scenario.

From this issue, it may be desirable to provide a solution to take advantage of the pre-knowledge of the situation of the D2D participators to further speed up the D2D communication setup.

SUMMARY OF THE INVENTIONS

To overcome limitations in the prior art described above, and to overcome other limitations that will be apparent upon reading and understanding the present specification, the disclosure provides a method for D2D communication setup and related apparatus and computer program products.

In a first aspect of the exemplary embodiments of the present invention provide a method that comprises sending, from a first device to a radio network node, a request to initiate device-to-device communication with a second device, the request comprising an identification of the second device and a first indicator indicating an intention of a device-to-device type of the communication; receiving, from the radio network node, a resource allocation; and transmitting service contents in the device-to-device communication directly between the first device and the second device using the allocated resources. The first indicator can indicate the resource allocation made by the radio network node is performed without procedure of probing and measurement report feedback In an exemplary embodiment, the first indicator can comprise a flag identifying the type of device-to-device communication.

In an exemplary embodiment, the first indicator can comprise a flag identifying a proximity level between the first device and the second device. Alternatively or additionally, the first indicator can comprise a flag identifying a level of channel quality between the first device and the second device.

In an exemplary embodiment, the call setup request can further comprise a second indicator indicative of information about interest service contents desired to be transmitted in the device-to-device communication, so that information about the interest service being learned by the second device prior to the transmitting. In the device-to-device communication, only service contents related to the interest service contents is received from the second device.

In an exemplary embodiment, the call setup request can further comprise a third indicator indicative of a preferred radio access technology to be used by the device-to-device communication; and the resources are allocated based on the third indicator. The third indicator can comprise a label indicative of the type of licensed band or a type of unlicensed band. When the third indicator indicates the type of licensed band, the resources can be allocated from a licensed band; and when the third indicator indicates the type of unlicensed band, the resources can be allocated from an unlicensed band.

In a second aspect of the exemplary embodiments of the present invention provide a method that comprises receiving, from a first device, a request to initiate cellular controlled device-to-device communication with a second device, the request comprising an identification of the second device and a first indicator indicating an intention of a device-to-device type of the communication; allocating resources for the device-to-device communication; and sending a resource allocation indicative of the resources allocated for the deviceto-device communication to both the first device and the second device. The allocation of resources can be performed directly based on the first indicator without a procedure of probing and measurement report feedback In an exemplary embodiment, the call setup request can further comprise a second indicator indicative of information about an interest service contents desired to be transmitted in the device-to-device communication; and the method can further comprise: sending information about the interest service to the second device together with the resource allocation, so that the second device sends only service contents related to the interest service contents to the first device in the device-to-device communication.

In an exemplary embodiment, the call setup request can further comprise a third indicator indicative of a preferred radio access technology to be used by the device-to-device communication; and allocating resources can comprise allocating resources based on the third indicator.

In a third aspect of the exemplary embodiments of the present invention provide an apparatus that comprises a transmitter; a receiver; and a controller configurable with the transmitter and the receiver to send from a first device to a radio network node, a request to initiate device-to-device communication with a second device, the request comprising an identification of the second device and a first indicator indicating an intention of a device-to-device type of the communication; receive from the radio network node, a resource allocation; and transmit service contents in the device-to-device communication directly between the first device and the second device using the allocated resources.

In a fourth aspect of the exemplary embodiments of the present invention provide an apparatus that comprises a receiver; a transmitter; and a controller configurable with the receiver and the transmitter to receive from a first device, a request to initiate cellular controlled device-to-device communication with a second device, the request comprising an identification of the second device and a first indicator indicating an intention of a device-to-device type of the communication; allocate resources for the device-to-device communication; and send a resource allocation indicative of the resources allocated for the device-to-device communication to both the first device and the second device.

In a fifth aspect of the exemplary embodiments of the present invention provide a radio access device comprising the apparatus according to a fifth aspect of the exemplary embodiments.

In a sixth aspect of the exemplary embodiments of the present invention provide an apparatus that comprises means for sending from a first device to a radio network node, a request to initiate device-to-device communication with a second device, the request comprising an identification of the second device and a first indicator indicating an intention of a device-to-device type of the communication; means for receiving from the radio network node, a resource allocation; and means for transmitting service contents in the device-to-device communication directly between the first device and the second device using the allocated resources.

In a seventh aspect of the exemplary embodiments of the present invention provide an apparatus that comprises means for receiving from a first device, a request to initiate cellular controlled device-to-device communication with a second device, the request comprising an identification of the second device and a first indicator indicating an intention of a device-to-device type of the communication; means for allocating resources for the device-to-device communication; and means for sending a resource allocation indicative of the resources allocated for the device-to-device communication to both the first device and the second device.

In an eighth aspect of the exemplary embodiments of the present invention provide a computer program product comprising at least one computer readable storage medium having computer program instructions stored therein, the execution of which result in operations that comprises: sending, from a first device to a radio network node, a request to initiate device-to-device communication with a second device, the request comprising an identification of the second device and a first indicator indicating an intention of a device-to-device type of the communication; receiving, from the radio network node, a resource allocation; and transmitting service contents in the device-to-device communication directly between the first device and the second device using the allocated resources.

In a ninth aspect of the exemplary embodiments of the present invention provide a computer program product comprising at least one computer readable storage medium having computer program instructions stored therein, the execution of which result in operations that comprises: receiving, from a first device, a request to initiate cellular controlled device-to-device communication with a second device, the request comprising an identification of the second device and a first indicator indicating an intention of a device-to-device type of the communication; allocating resources for the device-to-device communication; and sending a resource allocation indicative of the resources allocated for the device-to-device communication to both the first device and the second device.

Generally, all terms used in the claims are to be interpreted according to their ordinary meaning in the technical field, unless explicitly defined otherwise herein. All references to "a/an/the [element, device, apparatus, component, means, step, etc]" are to be interpreted openly as referring to at least one instance of said element, device, apparatus, component, means, step, etc., unless explicitly stated otherwise. The steps of any method disclosed herein do not have to be performed in the exact order disclosed, unless explicitly stated.

Those of skill in the art will appreciate that the above is merely an introduction to the subject matter described in more detail below. Other objectives, features and advantages of the present invention will appear from the following detailed disclosure, from the attached dependent claims as well as from the drawings.

BRIEF DESCRIPTION OF THE DRAWINGS

Embodiments of the present invention will now be described in more detail, reference being made to the enclosed drawings, in which.

DETAILED DESCRIPTION OF EXEMPLARY EMBODIMENTS

An exemplary embodiment of the present invention will be hereinafter described with reference to the drawings.

Figure 2:
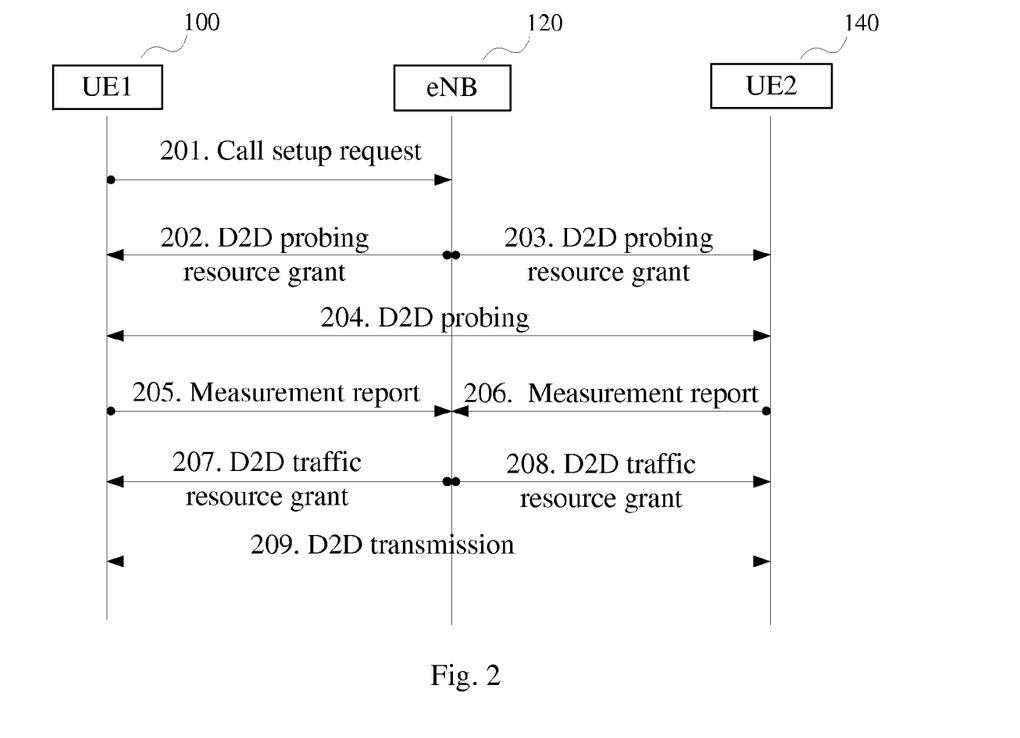
FIG. 2 is a flow chart illustrating a D2D communication setup in a conventional scheme.

FIG. 2 is a flow chart illustrating a D2D communication setup in the current cellular controlled D2D communication system, in the scenario as shown in FIG. 1. In step 201, UE 100 (UE1) sends a call setup request to an eNB 120 which is serving the cellular communication of UE 100, to initiate a D2D communication between UE 100 (UE1) and UE 140 (UE2). The call setup request is a common call setup request message as that in the cellular communication system, without including any position information of UE1 and UE2 or any expression of the D2D communication intention.

Then, as in the cellular communication system, after receiving the call setup request, the eNB 120 traditionally triggers UE 100 and UE 140 probing and measuring the channel quality between UEs, so as to seek the feasibility of D2D communication. As shown in step 202 and 203, eNB 120 send a D2D probing command such as a D2D probing resource grant message, to UE1 and UE2 respectively. Then these UEs send probing signal to each other in step 204 and feedback measurement reports to eNB 120 (step 205 and 206). Accord to the measurement reports from UE1 and UE2, eNB 120 can make a decision whether or not the channel quality between UE1 and UE2 can satisfy the establishment of a D2D communication between UE1 and UE2.

Obviously, the channel quality between UE1 and UE2 can satisfy a D2D communication, because the geographical location of between UE1 and UE2 are very close, e.g. they are face to face in the same meeting room. As such, eNB 120 can make a decision to establish a D2D communication between UE1 and UE2. Then eNB 120 would allocates resources for the D2D communication and send a D2D traffic resource grant message indicative of the allocated resources to participators (UE1 and UE2) of the D2D communication as shown in steps 207 and 208. Then, traffic transmission directly between UE1 and UE2 starts using the allocated resources.

It can be seen that, it is unnecessary to probe and feedback measurement reports for the D2D setup since in fact UE 100 knows the situation better than eNB 120 in the presented scenario. In light of this, the conventional scheme would result in large latency and resource waste due to the probing and measurement report feedback in steps 202 to 206.

Then, one of the inventor's basic ideas is to let the D2D communication participator UE to express its know-how to eNB while send D2D call setup request, so as to save the probing resource and speed up the setup process.

Figure 3:
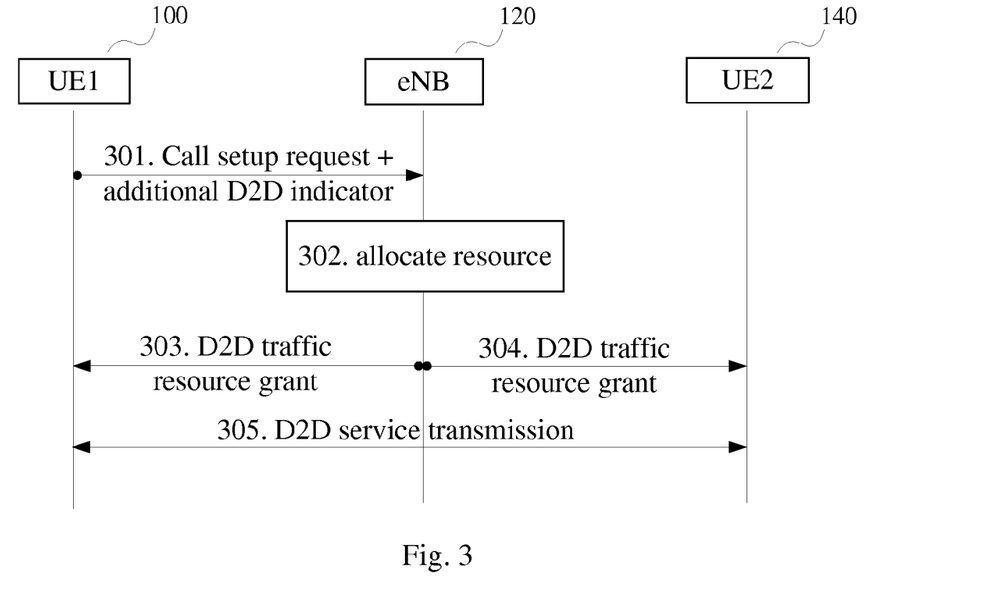
FIG. 3 is a flow chart illustrating a D2D communication setup in accordance with exemplary embodiments of the present invention.

FIG. 3 is a flow chart illustrating a procedure of a D2D communication setup in accordance with exemplary embodiments of the present invention.

In an exemplary embodiment of the present invention, a device, such as UE 100, is intended to transmitting service contents with other devices (such as UE 140) by means of cellular controlled D2D communication. UE 100 has some kinds of pre-knowledge with regard to the feasibility of D2D communication between the intended D2D communication participators (e.g. UE 100 and UE 140). For example, UE 100 and UE 140 may be located face to face in a same meeting room, so that UE 100 and UE 140 can predict that the channel quantity therebetween is good enough to satisfy a cellular controlled D2D communication.

In the scenario described as above, to speed up the D2D call setup, in step 301, UE 100 (UE1) can send to eNB 120 a call setup request to initiate a D2D communication between UE 100 and UE 140 (UE2). Different from the conventional call setup request, this call set request includes the callee's identification and an additional indicator, to express the intention of a D2D type of the communication.

For example, The call set request can include the UE2's phone number and one flag, such as a "*" or "#", to indicate the type of the communication which UE1 intended to establish by this request is a cellular controlled D2D communication. The callee's phone number and the additional indicator can be both inputted by a user of UE1 through an input interface of UE1, e.g. a keyboard. When the user of UE1 intents to initiate a D2D communication between UE1 and another UE such as UE2 located close to UE1, he/she can dial UE2's phone number, and then press a "*" or "#" key, or a special key for identifying the type of D2D communication.

In another exemplary embodiment, the indicator indicating an intention of a D2D type of the communication can be added in the call setup request automatically by the UE1 according to a pre-determined setting, without the user's manual input. For example, there can be a list of identifiers (for example in a memory in UE1), and a rule is set previously so that communications between UE1 and any of callees whose identifier lies in this list should be D2D communication. Then, when a callee's identifier of this list is dialed to initiate a call, UE1 can automatically add a flag identifying the type of D2D communication into the call setup request to be sent to eNB 120.

In another exemplary embodiment, the indicator indicating an intention of a D2D type of the communication can comprise a flag identifying a proximity level between the caller (such as UE1) and the callee (such as UE2). The proximity level belongs to the pre-knowledge of UE1, and can be determined by the user of UE1 or UE1 itself according to a pre-determined criterion. For example, when the distance between the caller and callee is within one meter, the proximity level is high; when the distance between the caller and callee is in the scope of one meter to ten meters, the proximity level is middle; and the distance the caller and callee is in the scope of ten meters to within fifty meters, the proximity level is low. The distant can be estimated by the user of UE1 through eye survey, or obtained by UE1 with some pre-knowledge, such as measurement report obtained during a previous communication between UE1 and UE2. Additionally or alternatively, the indicator indicating an intention of a D2D type of the communication can comprise a flag identifying a level of channel quality between the first device and the second device. Similar to the flag identifying proximity level, the flag identifying a level of channel quality belongs to the pre-knowledge of UE1 and can also be obtained by UE1 with some pre-knowledge, such as measurement report obtained during a previous communication between UE1 and UE2.

It should be appreciated, the call setup request can comprise a group including any combination of the additional indicators, i.e. any combination of a flag identifying the type of D2D communication, a flag identifying a proximity level between the first device and the second device, a flag identifying a level of channel quality between the first device and the second device.

In response to the receipt of the call setup request from UE1, from the additional indicator indicative of the intention of a D2D communication, eNB 120 can make sure that the channel quantity between the caller and the callee (between UE1 and UE2) is good enough to satisfy a cellular controlled D2D communication. Thereby, eNB 120 can allocate resources for the requested D2D communication directly based on the additional indicator in step 302, without the procedures of sending probe command, receiving measurement report and making a decision if a D2D type of communication is possible according to the measurement report as in the conventional scheme.

In another exemplary embodiment, when the additional indicator comprises a flag identifying proximity level and/or a flag identifying a level of channel quality, the eNB 120 can further determine whether or not a D2D type of communication is feasible currently based on the proximity level and/or the level of channel quality. For example, when there are too many users requesting for D2D communications at that time, eNB 120 may determine D2D call setup requests with low proximity level are not feasible. Rather, when there are few users requesting for D2D communications at that time, eNB 120 may determine D2D call setup requests with low proximity level are also feasible.

Then, eNB 120 can send a D2D resource allocation to all of the D2D participators, to indicate the resources allocated for the D2D communication among these participators. For example, eNB 120 sends a D2D traffic resource grant message to UE1 and UE2 as shown in steps 303 and 304, respectively. As such, UE1 and UE2 can transmit service contents directly therebetween using the allocated resources in step 305.

Although the invention is discussed with respect to an E-UTRAN (Evolved-Universal Terrestrial Radio Access Network) system, it is recognized by one of ordinary skill in the art that the invention has applicability to any type of cellular radio access systems, including radio access systems of GSM, UMTS, WiMAX, WiFi (Wireless Fidelity), etc. As such, in an exemplary embodiment, instead of eNB 120, the cellular controlled D2D communication can be controlled by other cellular network node, such as a base station in GSM, UMTS, WiMAX, or WiFi access system etc.

It can be seen that exemplary embodiments of the present invention can speed up D2D call setup for the scenario described as above by adding an additional flag into the call setup request to indicate the intention of D2D communication between the participators, by virtue of the pre-knowledge about the position of the participators, e.g. face to face in the same office. In the exemplary embodiments, D2D communication participators such as UE1 can predict channel quality most probably good enough for D2D communication where the D2D communication participators know they are close to each other with even possible in light of the sight of the channel condition therebetween. Thereby, comparing with the conventional scheme, the above exemplary embodiments skip at least two steps like probing and measurement report feedback, and the D2D communication participators can trigger a cellular controlled D2D communication proactively.

Figure 4:
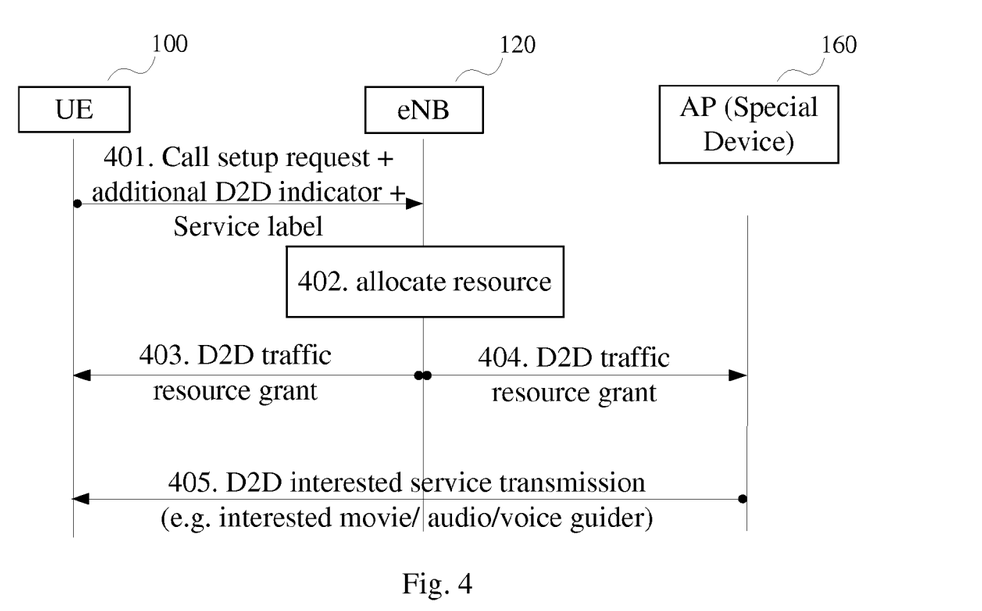
FIG. 4 is a flow chart illustrating a D2D communication setup in accordance with another exemplary embodiments of the present invention.

In an alternative embodiment of the present invention, in addition to the additional indicator for indicating the type of a D2D communication, the request can further comprises another additional indicator indicative of information about interest service contents desired to be transmitted in the intended D2D communication, so that information about the interest service being learned by the other D2D participator (such as UE2) prior to the actual D2D transmission; and then UE2 can only send to UE1 service contents related to the interest service contents. FIG. 4 shows a flow chart of a D2D communication setup in accordance with this exemplary embodiment.

This solution is helpful especially for visitors in a museum or a film festival. For the convenience of visitors in a museum or a film festival, the database of the museum or the organization of the film festival may supply audio information for each exhibition wirelessly through a special device such as a serving point referred to as an AP(access point) 160. Then, visitors can receive audio information for each exhibition stand through their mobile phones (referred to as UE 100), take mobile phones as audio guiders and download audio information from the database. In this scenario, the channel conditions between visitors' mobile phones and the AP are always good enough for a D2D communication, since the visitors' mobile phones are always close to the AP. In conventional D2D communication mechanism, even though the visitor knows he can communicate with the serving point (AP 160) by D2D communication, probing and D2D measurement report should be triggered before the actual D2D communication, and then information of all exhibitions will be downloaded from the database to visitors' mobile phones. If one visitor only interests some exhibitions, downloading the information of all exhibitions seems very wasteful and may cause unnecessary slow downloading rate.

In light of this, in an exemplary embodiment of the present invention, in addition to the additional indicator for indicating the D2D communication intention, another indicator is added into the call setup request to indicate which exhibition audio information should be downloaded, so as to avoid passive reception of all exhibition audio information. For example, the indicator indicative of the interest service contents can be a list of movie indexes of preferred movies. For example, the call setup request can include these indicators in the following form: the identifier of the D2D callee (e.g. AP 160)+one "*" indicative of the D2D intention, +labels, wherein the label can take a form of m (refers to movie)+moive_name. As shown in FIG. 4, Call setup request including the two kind of additional indicators are sent from UE 100 to eNB 120.

Then, similar as the setup procedure shown in FIG. 3, in response to the receipt of the call setup request from UE 100, from the additional indicator indicative of the intention of a D2D communication, eNB 120 can make sure that the channel quantity between the caller and the callee (between UE 100 and AP 160) is good enough to satisfy a cellular controlled D2D communication. Thereby, eNB 120 can directly allocate resources for the requested D2D communication in step 402 and send a D2D resource grant message to all of the D2D participators in steps 403 and 404, to indicate the resources allocated for the D2D communication between UE 100 and AP 160. Together with the resource allocation, the information about the interest service contents, which is indicated by the additional indicator in the call setup request, is also sent to AP 160.

As soon as the receipt of the D2D resource grant message for the D2D communication, the special AP 160 can send to UE 100 directly in step 405, the interested service contents, e.g. audio information of the preferred movies, voice and/or audio guider of the interested exhibitions, according to the received information about the interest service contents. Thereby, UE 100 can receive service contents only related to the interest service contents, so that UE 100 can avoid passive reception of all exhibition audio information.

In an alternative embodiment of the present invention, in addition to the additional indicator for indicating an intention of a D2D type of the communication, the request can further comprises another additional indicator indicative of a preferred radio access technology (RAT) to be used by the cellular controlled D2D communication. And then the cellular network node can allocate resources based on the indicated preferred radio access technology.

The preferred radio access technology can be indicated by a label indicative of a type of licensed band or a type of unlicensed band. It should be noted that no matter service contents transmission in the D2D communication between devices use resources in any kind of radio access technology, authorization and other control signaling should be controlled by eNB in the cellular system to improve security performance. FIGS. 5 and 6 show scenarios of cellular controlled D2D communication supporting heterogeneous radio access technology.

Figure 5A:
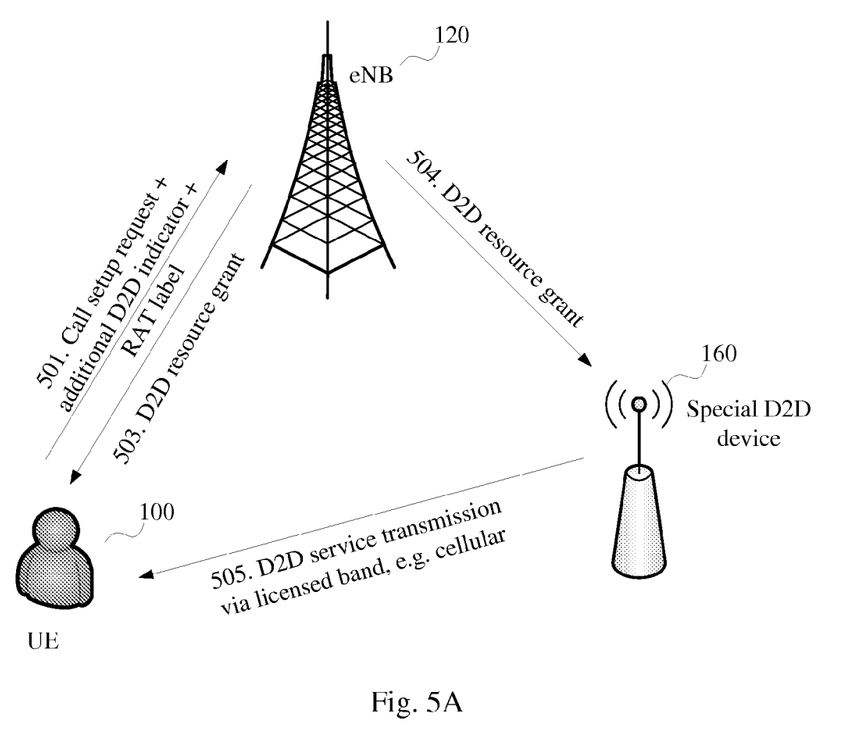
FIG. 5A shows a scenario of cellular controlled D2D communication using licensed band and FIG. 5B shows a flow chart illustrating the D2D communication setup therein, in accordance with exemplary embodiments of the present invention.
Figure 5B:
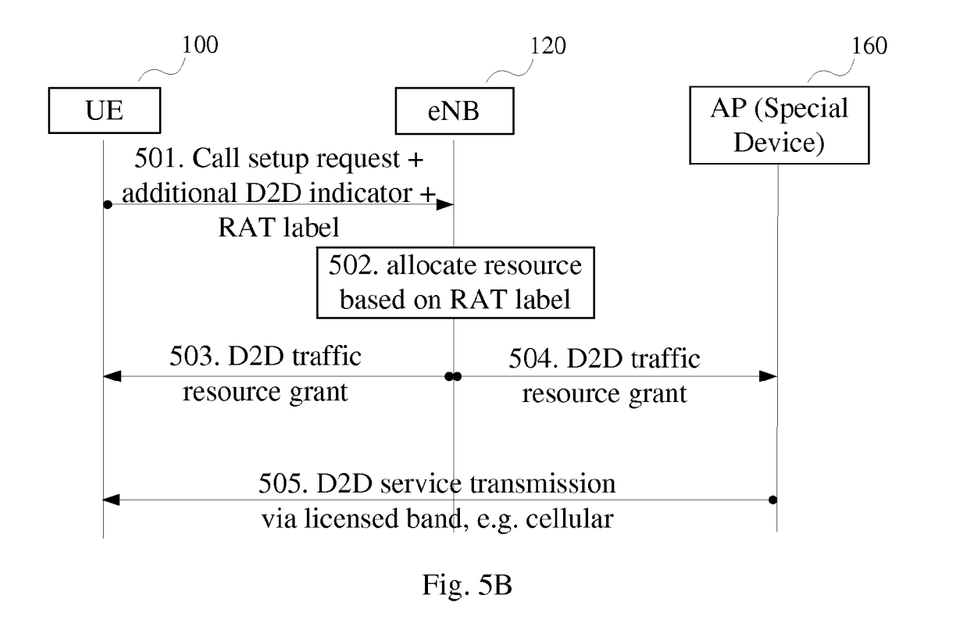

FIG. 5A shows scenarios a scenario of cellular controlled D2D communication using licensed band and FIG. 5B shows a flow chart illustrating the D2D communication setup therein, in accordance with exemplary embodiments of the present invention. In step 501, via a secured cellular link, UE 100 can send to eNB 120 a call setup request, which includes a flag indicative of the intention of a D2D communication and a label indicative of the preferred radio access technology. For example, the label indicative of the preferred radio access technology can indicate a type of licensed band, e.g. "cellular", for the purpose of e.g. guaranteed QoS.

Then, similar as the setup procedure shown in FIG. 3, in response to the receipt of the call setup request from UE 100, from the additional indicator indicative of the intention of a D2D communication, eNB 120 can make sure that the channel quantity between the caller and the callee (between UE 100 and AP 160) is good enough to satisfy a cellular controlled D2D communication. Thereby, eNB 120 can directly allocate resources for the requested D2D communication based on the label indicative of a type of licensed band, in step 502. For example, when the label indicates "cellular", eNB 120 can allocate resources from bands of a cellular communication system, e.g. GSM/GPRS, CDMA, WCDMA, TD-SCDMA, etc.

Then, eNB 120 sends a D2D resource grant message to all of the D2D participators (such as UE 100 and AP 160) in steps 503 and 504, to indicate the resources allocated for the D2D communication between UE 100 and AP 160. As such, UE 100 and AP 160 can transmit service contents directly therebetween using the allocated resources in bands of the cellular communication system, in step 505.

Figure 6A:
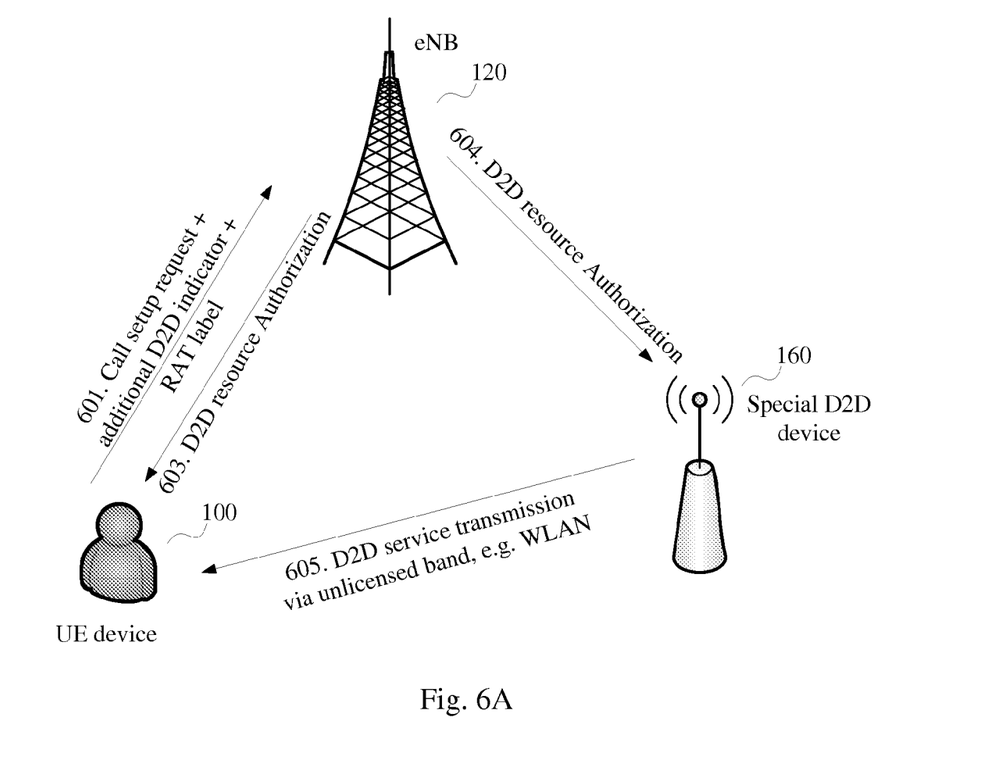
FIG. 6A shows a scenario of cellular controlled D2D communication using unlicensed band and FIG. 6B shows a flow chart illustrating the D2D communication setup therein, in accordance with exemplary embodiments of the present invention.
Figure 6B:
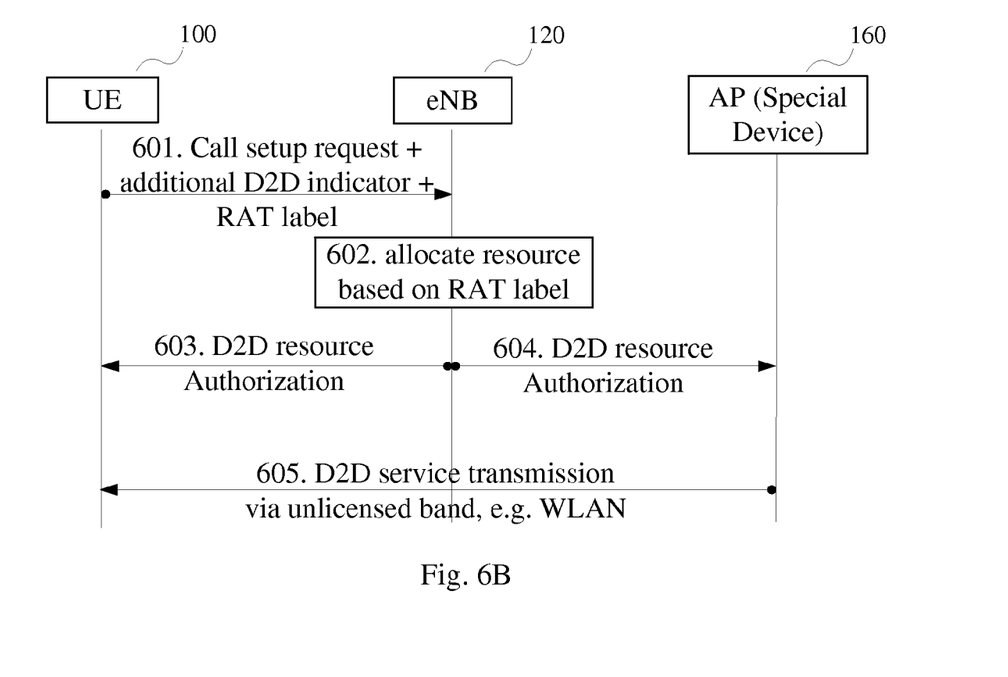

FIG. 6A shows a scenario of cellular controlled D2D communication using unlicensed band and FIG. 6B shows a flow chart illustrating the D2D communication setup therein, in accordance with exemplary embodiments of the present invention. In step 601, via a secured cellular link, UE 100 can send to eNB 120 a call setup request, which includes a flag indicative of the intention of a D2D communication and a label indicative of the preferred radio access technology. For example, the label indicative of the preferred radio access technology can indicate a type of unlicensed band, e.g. "WLAN", for the purpose of e.g. cost saving.

Then, similar as the setup procedure shown in FIG. 3, eNB 120 can directly allocate resources for the requested D2D communication based on the label indicative of a type of unlicensed band, in step 602. For example, when the label indicates "WLAN", eNB 120 can allocate resources from bands of a WLAN communication system. Then, eNB 120 sends messages to all of the D2D participators (such as UE 100 and AP 160) in steps 603 and 604, to authorize the D2D resources to UE 100 and AP 160 respectively. As such, UE 100 and AP 160 can transmit service contents directly therebetween, using the authorized resources in bands of the WLAN system, in step 605.

It should be appreciated, the call setup request can comprise all of the indicator indicating an intention of a D2D type of the communication, the indicator indicative of information about interest service contents desired to be transmitted in the D2D communication, and the indicator indicative of a preferred radio access technology to be used by the D2D communication.

It should be appreciated, although the callee in the embodiments as shown in FIGS. 5 and 6 is a AP, it is just an example, and the present invention is not intended to be limited to this. For example, the callee can be a special D2D device, such as a UE supporting heterogeneous D2D transmission. Meanwhile, communication between eNB 120 and the callee such as AP 160 in the steps 503 and 604 can be carried wirelessly, or wirely (e.g. through X2 interface).

It should be further appreciated that although the description thus far has been primarily in the context of two devices that are involved in the D2D connection, the use of these exemplary embodiments may involve more than two devices in a given D2D connection. For example, one or more of FIGS. 3, 4, 5 and 6 may be modified to include a UE1, UE2, UE3, and AP1, AP2 and AP3.

Figure 7:
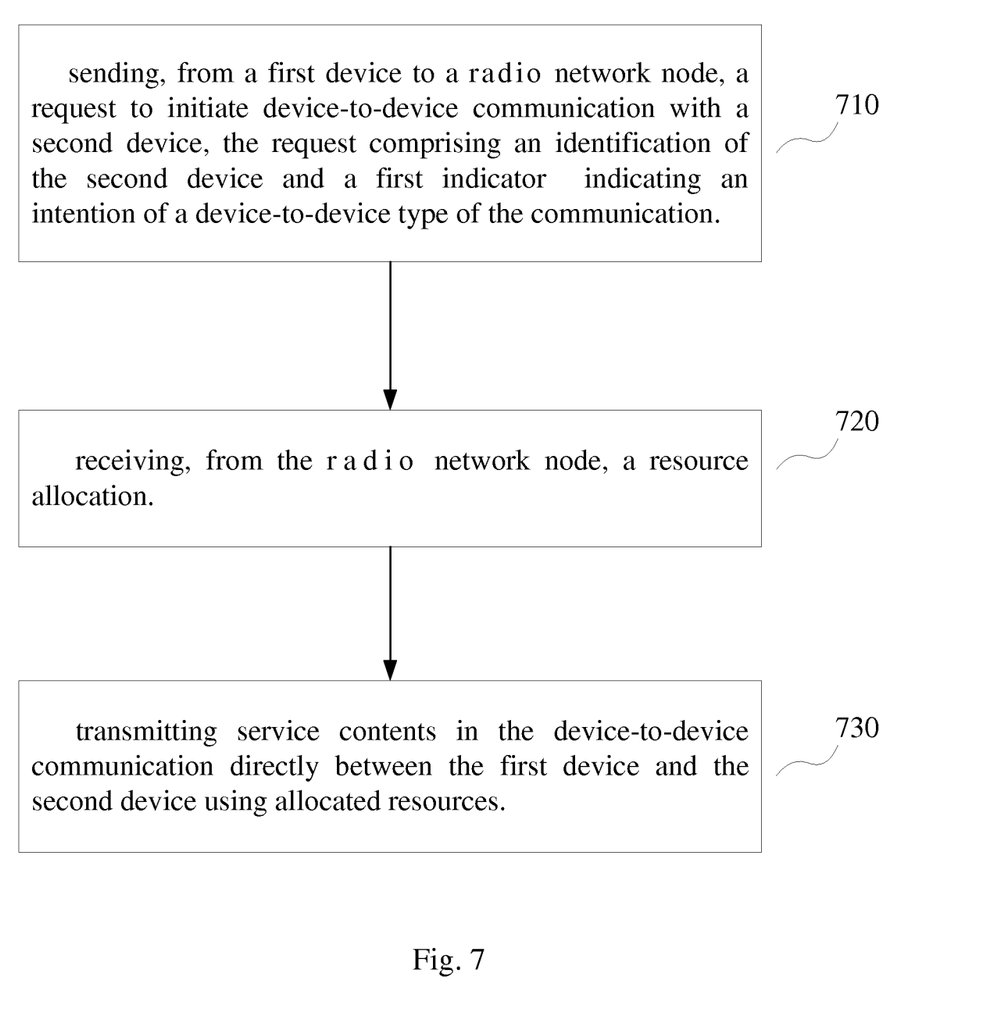
FIGS. 7 and 8 are logic flow diagrams that illustrate the operations of methods in accordance with exemplary embodiments of the present invention.
Figure 8:
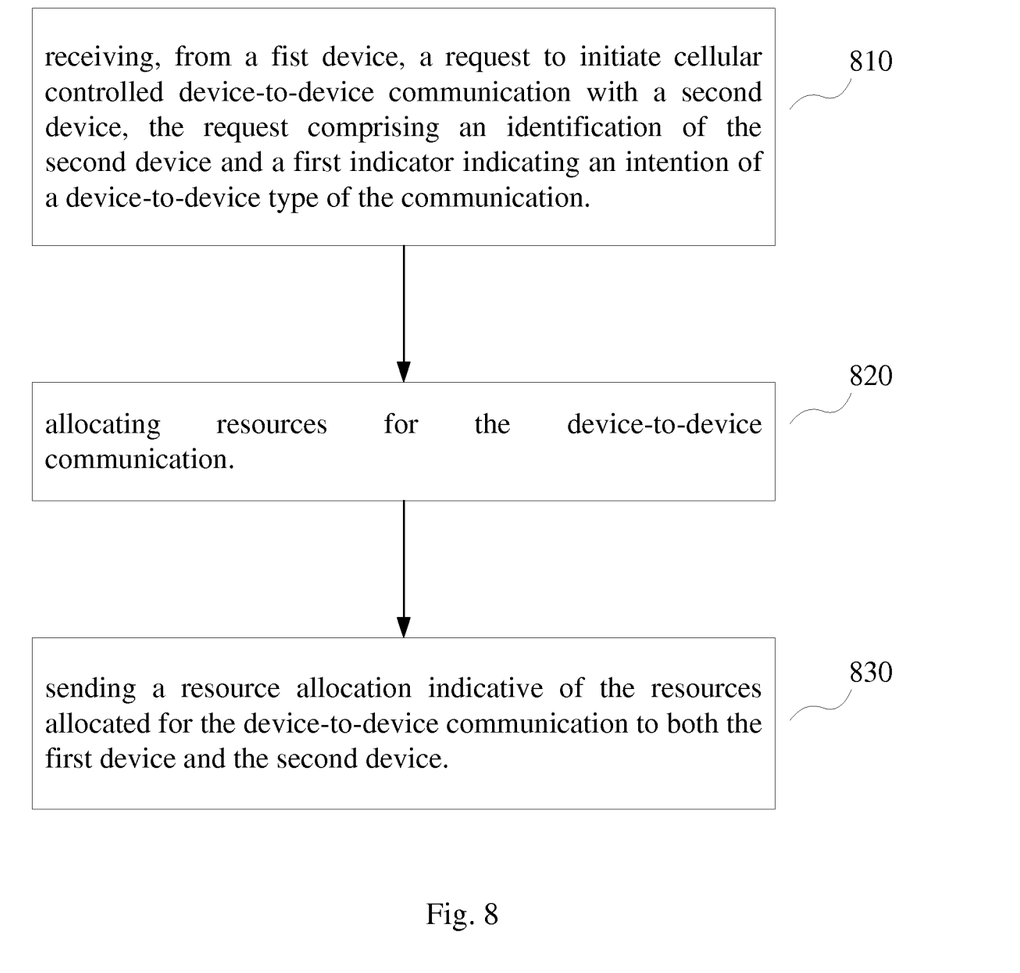

FIGS. 7 and 8 are logic flow diagrams that illustrate the operations of methods, and a result of executions of computer program instructions, in accordance with the exemplary embodiments of this invention for establishing a cellular controlled D2D communication between a first device and a second device, and more specifically is descriptive of message flow between a mobile communication device such as UE 100, and a cellular network access point or node, such as the eNB 120.

At Block 710 there is a step of sending, from a first device (such as UE1) to a radio network node (such as eNB 120), a request to initiate device-to-device communication with a second device (such as UE2 or AP), the request comprising an identification of the second device and a first indicator indicating an intention of a device-to-device type of the communication. At Block 720 there is a step of receiving, from the radio network node, a resource allocation. The resource allocation can indicate resources allocated for the device-to-device communication. The first indicator can indicate that the allocation of resources should be performed directly by the radio network node without a procedure of probing and measurement report feedback. At Block 730 there is a step of transmitting service contents in the device-to-device communication directly between the first device and the second device using the allocated resources.

At Block 810 there is a step of receiving, from a first device (such as UE1), a request to initiate cellular controlled device-to-device communication with a second device (such as UE2 or AP), the request comprising an identification of the second device and a first indicator indicating an intention of a device-to-device type of the communication. At Block 820 there is a step of allocating resources for the device-to-device communication. The allocation of resources can be performed directly based on the first indicator without a procedure of probing and measurement report feedback. At Block 830 there is a step of sending a resource allocation indicative of the resources allocated for the device-to-device communication to both the first device and the second device.

The various blocks shown in FIGS. 7 and 8 may be viewed as method steps, and/or as operations that result from operation of computer program code, and/or as a plurality of coupled logic circuit elements constructed to carry out the associated function(s).

Figure 9:
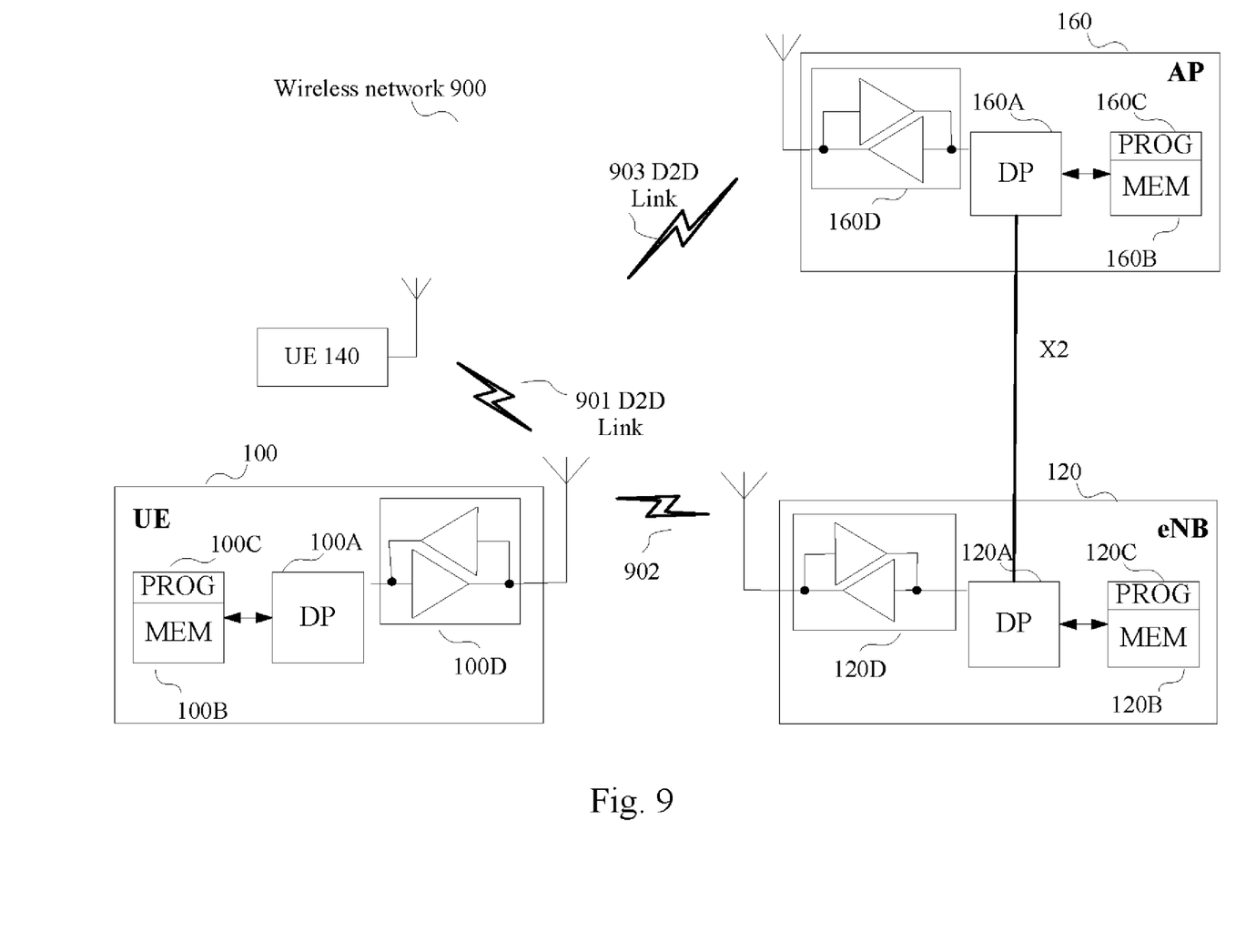
FIG. 9 shows a simplified block diagram of various devices that are suitable for use in practicing the exemplary embodiments of the present invention.

Now reference is made to FIG. 9 illustrating a simplified block diagram of various electronic devices that are suitable for use in practicing the exemplary embodiments of the present invention. In FIG. 9, a cellular wireless network 900 is adapted for communication with an apparatus, such as a mobile communication device which may be referred to as a UE 100, via a cellular network access node or network entity, such as a Node B (base station), and more specifically an eNB 120. The network 900 may include infrastructure network control elements (not shown) that provide connectivity with the other network, such as a telephone network and/or a data communications network (e.g., the internet). The infrastructure network control elements can be organized in a basic structure and operate in a basic way well known to one skilled in the art. A service access point such as an AP (referred to as an AP 160) may be coupled to eNB 120 through X2 interface. UE 100 can establish a D2D communicate path 903 with AP 160 according to the exemplary embodiments of the present invention as discussed above. In practice there will be a plurality of mobile communication devices (e.g., UE 100, UE 140). A D2D communication path 902 between UE 100 to UE 140 can be established according to the exemplary embodiments of the present invention as discussed above.

The UE 100 includes a data processor (DP) 100A, a memory (MEM) 100B that stores a program (PROG) 100C, and a suitable radio frequency (RF) transceiver 100D for bidirectional wireless communications 901 with the eNB 120 via one or more antennas. In an exemplary embodiment, the transceiver 100D in the UE 100 can be used for D2D communications in both licensed band (e.g. cellular band) and unlicensed band (e.g. WLAN band). Alternatively, the transceiver 100D can comprise separate components to support D2D communications in licensed band (e.g. cellular band) and unlicensed band (e.g. WLAN band) respectively.

The AP 160 also includes a DP 160A, a MEM 160B that stores a PROG 160C, and a suitable RF transceiver 160D. In an exemplary embodiment, the transceiver 160D in the AP 160 can be used for D2D communications in both licensed band (e.g. cellular band) and unlicensed band (e.g. WLAN band). Alternatively, the transceiver 160D can comprise separate components to support D2D communications in licensed band (e.g. cellular band) and unlicensed band (e.g. WLAN band) respectively.

The eNB 120 also includes a DP 120A, a MEM 120B that stores a PROG 120C, and a suitable RF transceiver 120D.

At least one of the PROGs 100C, 120C, 160C is assumed to include program instructions that, when executed by the associated DP, enable the electronic device to operate in accordance with the exemplary embodiments of this invention, as discussed above. That is, the exemplary embodiments of this invention may be implemented at least in part by computer software executable by the DP 100A of the UE 100, by the DP 120A of the eNB 120, and by the DP 160A of the AP 160, or by hardware, or by a combination of software and hardware. The basic structure and operation of UE 100, eNB 120 and AP 160 are known to one skilled in the art.

In general, the various embodiments of the UE 100 can include, but are not limited to, cellular telephones, personal digital assistants (PDAs) having cellular wireless communication capabilities, portable computers having cellular wireless communication capabilities, image capture devices such as digital cameras having wireless communication capabilities, gaming devices having cellular wireless communication capabilities, music storage and playback appliances having cellular wireless communication capabilities, Internet appliances permitting cellular wireless Internet access and browsing, as well as portable units or terminals that incorporate combinations of such functions.

The MEMs 100B, 120B, 160B may be of any type suitable to the local technical environment and may be implemented using any suitable data storage technology, such as semiconductor based memory devices, flash memory, magnetic memory devices and systems, optical memory devices and systems, fixed memory and removable memory. The DPs 100A, 120A, 160A may be of any type suitable to the local technical environment, and may include one or more of general purpose computers, special purpose computers, microprocessors, digital signal processors (DSPs) and processors based on multi-core processor architectures, as non-limiting examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. It should thus be appreciated that the exemplary embodiments of this invention may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this invention.

It should be appreciated that at least some aspects of the exemplary embodiments of the inventions may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

The present invention includes any novel feature or combination of features disclosed herein either explicitly or any generalization thereof. Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-Limiting and exemplary embodiments of this invention.

What is claimed is:

1. A method, comprising:
sending, by a first device to a radio network node, a request to initiate device-to-device communication with a second device, the request comprising an identification of the second device and a first indicator comprising a proximity indicator representative of a distance between the first device and the second device;
receiving, from the radio network node, a resource allocation for the device-to-device communication; and
transmitting, using the resource allocation, content in the device-to-device communication directly between the first device and the second device.

2. The method according to claim 1, wherein the proximity indicator comprises a flag representative of the distance between the first device and the second device.

3. The method according to claim 1, wherein the request further comprises a second indicator indicative of information about the content desired to be transmitted in the device-to-device communication; and wherein the method further comprises receiving the content only related to the information of content from the second device.

4. The method according to claim 1, wherein the the resource allocation is performed by the radio network node based on the first indicator, without a procedure of probing and measurement report feedback.

5. A method, comprising:
receiving, from a first device, a request to initiate cellular controlled device-to-device communication with a second device, the request comprising an identification of the second device and a first indicator comprising a proximity indicator representative of a distance between the first device and the second device;
allocating one or more resources for the device-to-device communication; and
sending, to the first device and the second device, a resource allocation indicative of the one or more resources allocated for the device-to-device communication.

6. The method according to claim 5, wherein the proximity indicator comprises a flag representative of the distance between the first device and the second device.

7. The method according to claim 5, wherein the request further comprises a second indicator indicative of information about the content desired to be transmitted in the device-to-device communication; and
wherein the sending further comprises: sending information about the content to the second device together with the resource allocation, wherein the second device sends only the content related to the information of content to the first device in the device-to-device communication.

8. The method according to claim 5, wherein the allocating is performed directly based on the first indicator without a procedure of probing and measurement report feedback.

9. An apparatus, comprising at least one processor and at least one memory including computer program code, the at least one memory and the computer program code configured to, with the processor, cause the apparatus to at least perform:
send, by a first device to a radio network node, a request to initiate device-to-device communication with a second device, the request comprising an identification of the second device and a first indicator comprising a proximity indicator representative of a distance between the first device and the second device;
receive, from the radio network node, a resource allocation for the device-to-device communication; and
transmit, using the resource allocation, content in the device-to-device communication directly between the first device and the second device.

10. The apparatus according to claim 9, wherein the proximity indicator comprises a flag representative of the distance between the first device and the second device.

11. The apparatus according to claim 9, wherein the first indicator comprises a flag identifying a level of channel quality between the first device and the second device.

12. The apparatus according to claim 9, wherein the request further comprises a second indicator indicative of information about the content desired to be transmitted in the device-to-device communication; and wherein the apparatus is further configured to at least receive content only related to the information of content from the second device.

13. The apparatus according to claim 9, wherein the request further comprises a third indicator indicative of a preferred radio access technology to be used by the device-to-device communication; and wherein the resource allocation is based on the third indicator.

14. An apparatus, comprising at least one processor and at least one memory including computer program code, the at least one memory and the computer program code configured to, with the processor, cause the apparatus to at least perform:
receive, from a first device, a request to initiate cellular controlled device-to-device communication with a second device, the request comprising an identification of the second device and a first indicator comprising a proximity indicator representative of a distance between the first device and the second device;
allocate one or more resources for the device-to-device communication; and
send, to the first device and the second device, a resource allocation indicative of the one or more resources allocated for the device-to-device communication.

15. The apparatus according to claim 14, wherein the proximity indicator comprises a flag representative of the distance between the first device and the second device.

16. The apparatus according to claim 14, wherein the request further comprises a second indicator indicative of information about the content desired to be transmitted in the device-to-device communication; and
wherein the apparatus is further configured to at least: send information about the content to the second device together with the resource allocation, wherein the second device sends only the content related to the information of content to the first device in the device-to-device communication.

17. The apparatus according to claim 14, wherein the request further comprises a third indicator indicative of a preferred radio access technology to be used by the device-to-device communication; and, wherein the apparatus is further configured to at least allocate resources based on the third indicator.

18. The apparatus according to claim 14, wherein the resource allocation is performed without a procedure of probing and measurement report feedback.

19. A computer program product comprising at least one non-transitory computer readable storage medium having computer program instructions stored therein, the execution of which result in operations that comprises:
sending, by a first device to a radio network node, a request to initiate device-to-device communication with a second device, the request comprising an identification of the second device and a first indicator comprising a proximity indicator representative of a distance between the first device and the second device;

receiving, from the radio network node, a resource allocation for the device-to-device communication; and transmitting, using the resource allocation, content in the device-to-device communication directly between the first device and the second device.

20. A computer program product comprising at least one non-transitory computer readable storage medium having computer program instructions stored therein, the execution of which result in operations that comprises:

receiving, from a first device, a request to initiate cellular controlled device-to-device communication with a second device, the request comprising an identification of the second device and a first indicator comprising a proximity indicator representative of a distance between the first device and the second device;

allocating one or more resources for the device-to-device communication; and sending, to the first device and the second device, a resource allocation indicative of the one or more resources allocated for the device-to-device communication.

* * * * *